(12) United States Patent
Wood (10) Patent No.: US 7,522,103 B2
(45) Date of Patent: Apr. 21, 2009

(54) ELECTROMAGNETIC IMPULSE TRANSMISSION SYSTEM AND METHOD OF USING SAME

(75) Inventor: James R. Wood, Grapevine, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 203 days.

(21) Appl. No.: 11/217,011

(22) Filed: Aug. 31, 2005

(65) Prior Publication Data
US 2007/0044674 A1    Mar. 1, 2007

(51) Int. Cl.
*H01L 35/00* (2006.01)
(52) U.S. Cl. .............................. 343/700 R; 315/111.21; 343/907
(58) Field of Classification Search ................. 102/207, 102/214, 209, 306, 275.5, 374, 518; 89/1.57, 89/7, 6.5; 343/700 R, 701, 755, 782, 907; 315/111.21
See application file for complete search history.

(56) References Cited

U.S. PATENT DOCUMENTS 4,506,267 A    3/1985    Harmuth ..................... 343/744
5,864,322 A *  1/1999   Pollon et al. ................. 343/909
6,842,146 B2 * 1/2005   Alexeff et al. ............... 343/701
6,843,178 B2 * 1/2005   Wood et al. ............... 102/275.5
6,845,718 B2 * 1/2005   Fortner et al. ................ 102/518
7,030,172 B2 * 4/2006   Sakurai ....................... 523/137

* cited by examiner

*Primary Examiner*—Haissa Philogene
(74) *Attorney, Agent, or Firm*—Daren C. Davis; James E. Walton (57) ABSTRACT

An electromagnetic impulse transmission system includes a plasma antenna generator, an electromagnetic impulse generator electrically coupled with the plasma antenna generator, and a ground plane structure operably associated with the plasma antenna generator. An electromagnetic impulse transmission system includes a plasma antenna, an electromagnetic impulse generator electrically coupled with the plasma antenna, and a ground plane operably associated with the plasma antenna. A method includes the steps of providing a plasma antenna generator, an electromagnetic impulse generator, and a ground plane structure; generating a plasma antenna with the plasma antenna generator; and transmitting an electromagnetic impulse from the electromagnetic impulse generator to the plasma antenna. The method further includes radiating the electromagnetic impulse from the plasma antenna such that at least a portion of the electromagnetic impulse is reflected by the ground plane structure.

27 Claims, 8 Drawing Sheets

ELECTROMAGNETIC IMPULSE TRANSMISSION SYSTEM AND METHOD OF USING SAME

BACKGROUND

1. Field of the Invention

The present invention relates to electromagnetic impulse transmission systems. In particular, the present invention relates to an electromagnetic impulse transmission system including a plasma antenna generator.

2. Description of Related Art

Electromagnetic energy can be used in many ways to sense objects from a distance. Radar, for example, is reflected electromagnetic energy used to determine the velocity and location of a targeted object. It is widely used in such applications as aircraft and ship navigation, military reconnaissance, automobile speed checks, and weather observations.

Figure 1:
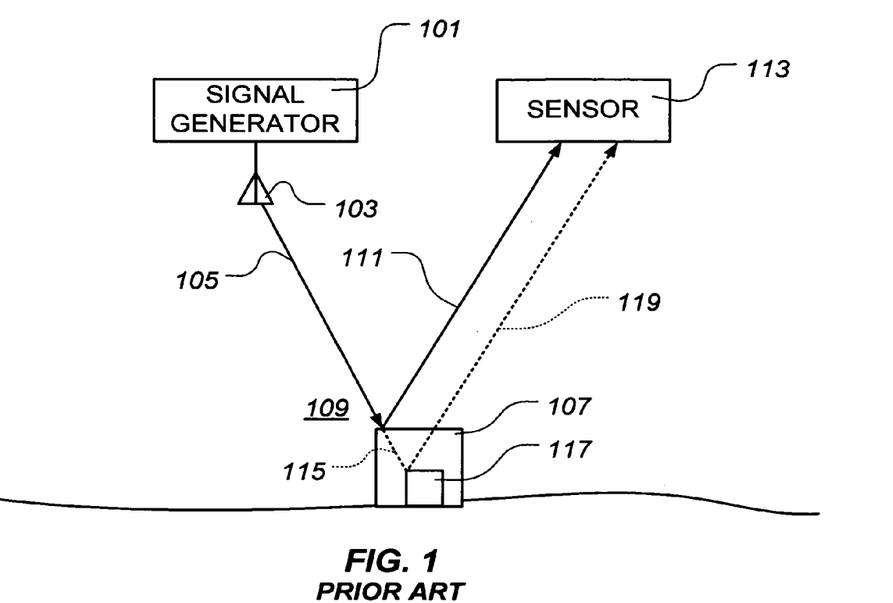
FIG. 1 is a graphical representation of the radiation and reception of an electromagnetic signal, as is conventionally known.

In certain situations, it is desirable to radiate one or more electromagnetic impulses to sense objects within the area, such as with conventional radar. Generally, as illustrated in FIG. 1, a signal generator 101 generates an electromagnetic impulse, which is radiated by an antenna 103 as an electromagnetic wave 105. Upon encountering an interface, such as an interface between an object 107 and air 109, a portion of the energy of electromagnetic wave 105 is reflected as an electromagnetic wave 111. Reflected electromagnetic wave 111 may then be received by a sensor 113, which analyzes reflected electromagnetic wave 111 to determine various characteristics of object 107.

As discussed above, only a portion of the energy of wave 105 is reflected as electromagnetic wave 111. The rest of the energy of electromagnetic wave 105 propagates into object 107 as electromagnetic wave 115. Upon encountering a second interface, such as an interface between object 107 and a second object 117 disposed within object 107, a portion of the energy of electromagnetic wave 115 is reflected as a second reflected electromagnetic wave 119. Second reflected electromagnetic wave 119 may then be received by sensor 113 to determine various characteristics of object 117. Impulse radar sensing uses these techniques for identifying characteristics of objects under ground, under water, within buildings, and the like.

It is often desirable to deploy such antennas, e.g., antenna 103, during flight. For example, a vehicle approaching an object may deploy an antenna so that electromagnetic energy may be directed toward the object. Conventional antennas generally include rigid or semi-rigid members that may be compactly folded for storage and transport and then unfolded when needed. Alternatively, conventional antennas may be wires that are explosively deployed or deployed by parachutes. A substantial amount of time is often required to deploy such antennas, which results in additional planning to determine the appropriate time to begin deployment so that the antenna will be available when needed. Further, circumstances may arise in which the immediate transmission of electromagnetic energy is desirable. If the antenna has not been deployed, there may not be sufficient time to deploy the antenna and transmit the electromagnetic energy in the desired time frame.

In other implementations, the vehicle from which the antenna is being deployed may be traveling at a very high rate of speed, for example, at a speed greater than the speed of sound. If the medium through which the vehicle is traveling has significant density, such as an atmosphere, considerable forces may act on such conventional antennas when deployed. It may, therefore, be very difficult, if not impossible, for such conventional antennas to be deployed without damage from fast-moving vehicles.

It is also desirable in certain situations to transmit electromagnetic energy having a broad spectrum of frequencies or to transmit low frequency electromagnetic energy. Generally, longer antennas are capable of transmitting electromagnetic energy more efficiently at lower frequencies than shorter antennas. Such longer antennas are typically capable of transmitting electromagnetic energy having higher frequencies as well. Longer, foldable antennas require more storage space, are typically more complex, generally take longer to unfold, and are typically more susceptible to damage upon deployment.

Sensing systems using short pulse (i.e., impulse), high energy sources need antennas that have a low ratio of electrical reactance to electrical resistance. Such antennas are commonly known as "low Q" antennas, as the ratio of electrical reactance to electrical resistance is represented by "Q." Generally, the value of Q for an antenna is inversely proportional to the usable bandwidth for the antenna. Moreover, the use of antennas that have larger Q values in sensing systems employing short pulse, high energy sources may result in "antenna ringing". Antenna ringing is undesirable, as it interferes with electromagnetic energy returned from objects or targets.

While there are many electromagnetic impulse sensing systems and antenna configurations for such systems well known in the art, considerable room for improvement remains.

SUMMARY OF THE INVENTION

There is a need for an electromagnetic impulse transmission system.

Therefore, in one aspect of the present invention, an electromagnetic impulse transmission system is provided. The electromagnetic impulse transmission system includes a plasma antenna generator, an electromagnetic impulse generator electrically coupled with the plasma antenna generator, and a ground plane structure operably associated with the plasma antenna generator.

In another aspect of the present invention, an electromagnetic impulse transmission system is provided. The electromagnetic impulse transmission system includes a plasma antenna, an electromagnetic impulse generator electrically coupled with the plasma antenna, and a ground plane operably associated with the plasma antenna.

In yet another aspect of the present invention, a sensing system is provided. The sensing system includes a plasma antenna generator, an electromagnetic impulse generator electrically coupled with the plasma antenna generator, and a ground plane structure operably associated with the plasma antenna generator. The sensing system further includes a sensor adapted to receive a reflected electromagnetic impulse, such that reflected electromagnetic impulse is at least a portion of an electromagnetic impulse generated by the electromagnetic impulse generator and transmitted via a plasma antenna generated by the plasma antenna generator.

In another aspect of the present invention, a method is provided. The method includes the steps of providing a plasma antenna generator, an electromagnetic impulse generator, and a ground plane structure; generating a plasma antenna with the plasma antenna generator; and transmitting an electromagnetic impulse from the electromagnetic impulse generator to the plasma antenna. The method further includes radiating the electromagnetic impulse from the plasma antenna such that at least a portion of the electromagnetic impulse is reflected by the ground plane structure.

The present invention provides significant advantages, including: (1) providing a electromagnetic impulse transmission system having an antenna that can easily be deployed while in motion; (2) providing an electromagnetic impulse transmission system having an antenna exhibiting a low ratio of electrical reactance to electrical resistance; (3) providing an electromagnetic impulse transmission system capable of transmitting electromagnetic energy having a broad spectrum of frequencies and/or capable of transmitting low frequency electromagnetic energy; and (4) providing a electromagnetic impulse transmission system that provides an efficient electromagnetic impulse for use in sensing systems, such as impulse radar systems.

Additional objectives, features and advantages will be apparent in the written description which follows.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention represents an electromagnetic impulse transmission system and a method of using the system. The electromagnetic impulse transmission system includes an apparatus for generating a plasma antenna, such that the electromagnetic impulse transmission system transmits an electromagnetic impulse over the plasma antenna. While the electromagnetic impulse transmission system of the present invention may find many uses, each of which being within the scope of the present invention, the electromagnetic impulse transmission system is particularly useful in systems to detect and/or characterize objects under ground, under water, within buildings, and the like. Plasma antennas generated by the present invention exhibit a low ratio of electrical reactance to electrical resistance (i.e., low "Q") to inhibit antenna ringing. Moreover, plasma antennas are readily generated by and utilized in the present invention during flight.

In this Specification, reference may be made to the directions at which certain materials are propelled and to the direction of plasma generation, as depicted in the attached drawings. However, as will be recognized by those skilled in the art after a complete reading of the present application, the device and systems described herein may be positioned in any desired orientation. Thus, the reference to a particular direction should be understood to represent a relative direction and not an absolute direction. Similarly, the use of terms such as "above", "below", or other like terms to describe a spatial relationship between various components should be understood to describe a relative relationship between the components as depicted in the drawings, as the device described herein may be oriented in any desired direction.

Figure 2:
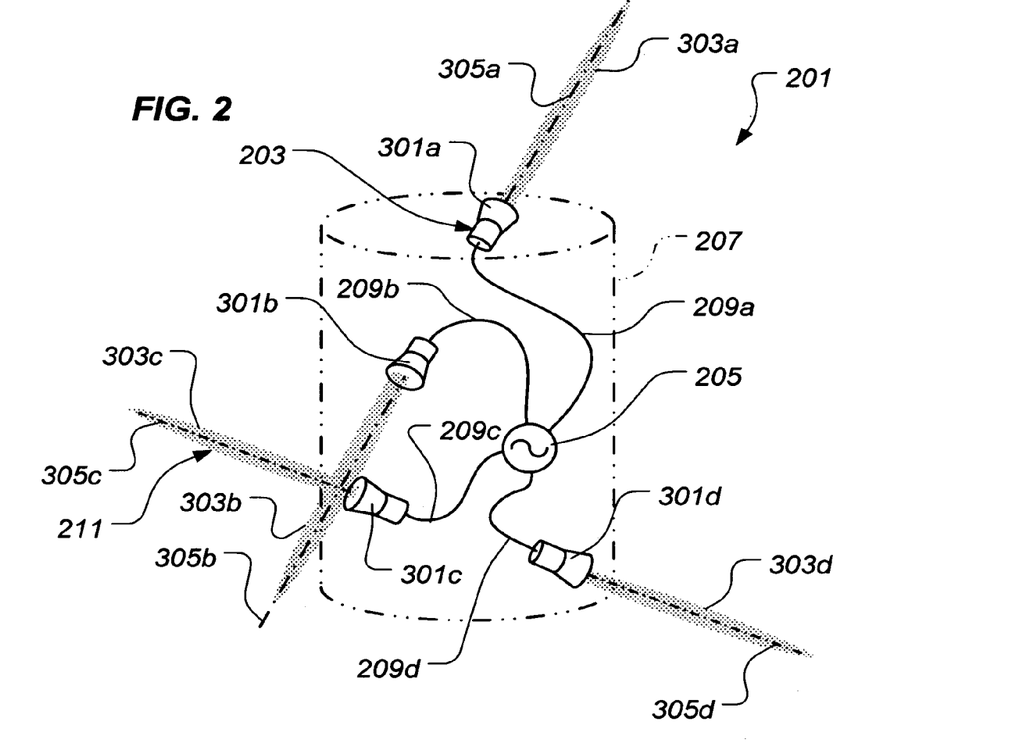
FIG. 2 is a stylized, perspective view of a first illustrative embodiment of an electromagnetic impulse transmission system according to the present invention.

FIG. 2 depicts one particular embodiment of an electromagnetic impulse transmission system 201 according to the present invention. Generally, electromagnetic impulse transmission system 201 includes a plasma antenna generator 203 and an electromagnetic impulse generator 205. While the present invention is not so limited, plasma antenna generator 203 may correspond to any of the plasma antenna generator embodiments disclosed in commonly-assigned U.S. patent application Ser. No. 11/184,520 to James R. Wood, filed on 19 Jul. 2005, which is expressly incorporated herein by reference for all purposes. Electromagnetic impulse generator 205 may comprise any suitable electromagnetic impulse generator known to the art, such as a radio frequency energy generator electrically coupled with an explosive flux compressor, such as the explosive flux compressors of commonly-assigned U.S. Pat. No. 6,843,178 to Wood et al., and commonly-assigned U.S. Pat. No. 6,845,718 to Fortner et al., each of which is expressly incorporated herein by reference for all purposes. Moreover, electromagnetic impulse generator 205 may comprise any suitable radio frequency energy generator electrically coupled with a Marx generator, such as the Marx generator of commonly-assigned U.S. Pat. No. 6,845,718 to Fortner et al., previously incorporated herein by reference for all purposes. Electromagnetic impulse generator 205 transmits an electromagnetic impulse over a plasma antenna generated by plasma antenna generator 203.

Electromagnetic impulse transmission system 201 comprises plasma antenna generator 203 and electromagnetic impulse generator 205 disposed in a housing or body 207, which is shown in phantom to better illustrate the present invention. Plasma antenna generator 203 comprises one or more plasma sources 301, shown in FIG. 3, that are each adapted to generate generally columnar plasmas 303 generally along axes 305 extending from plasma sources 301. Note that in FIG. 3, specific plasma sources 301, plasmas 303, and axes 305 are indicated as plasma sources 301a-301d, plasmas 303a-303d, and axes 305a-305d, respectively. Also, note that columnar plasmas 303 can be, but need not be, cylindrical in form. Leads 209 electrically connect electromagnetic impulse generator 205, plasma sources 301, and, when generated, plasmas 303. Plasmas 303a-303d form a plasma antenna 211 according to the present invention.

Figure 3:
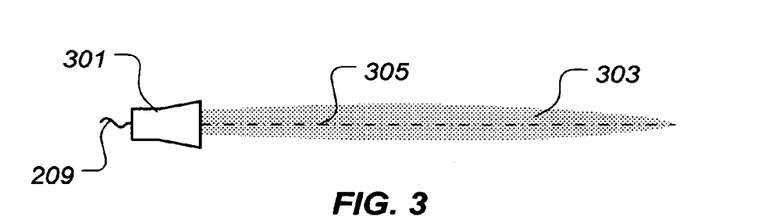
FIG. 3 is a stylized, side, elevational view of an illustrative embodiment of a columnar plasma source of FIG. 2, according to present invention.

Generally, plasma sources 301 include an explosive material that, when detonated, propels an ionizable material and imparts heat to the ionizable material sufficient to achieve at least the ionizing temperature of the ionizable material. As particles of the ionizable material are ionized, plasma trails are produced comprising ions and free electrons. The plasma trails, in the aggregate, form plasma 303. The free electrons act as an antenna that is capable of reflecting electromagnetic energy having frequencies below the cut-off frequency of plasma 303. Electromagnetic energy having frequencies above the cut-off frequency of plasma 303 generally propagates through plasma 303. The plasma cut-off frequency of plasma 303 is generally proportional to the square root of the electron density of plasma 303.

Figure 4:
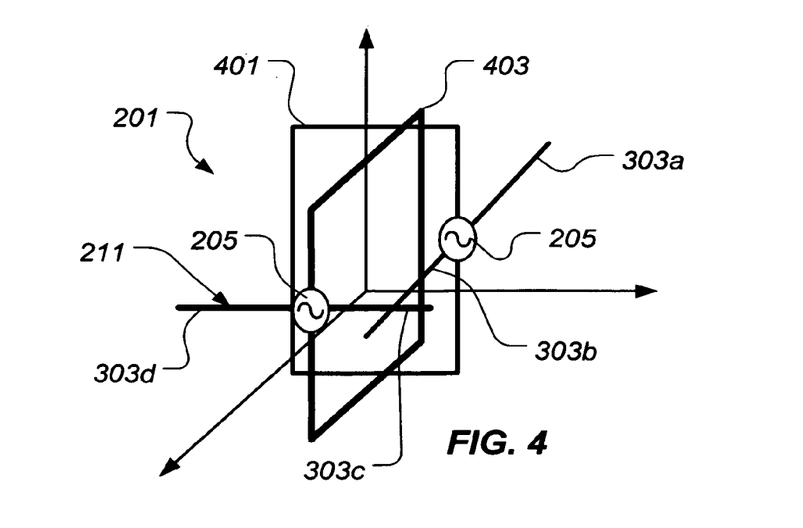
FIG. 4 is a schematic representation of the electromagnetic impulse transmission system of FIG. 2.

FIG. 4 depicts a schematic representation of electromagnetic impulse transmission system 201. Plasma antenna generator 203, in the embodiment illustrated in FIG. 2, forms a crossed-dipole or "turnstile" antenna. In the illustrated embodiment, body 207 is operably associated with plasma antenna generator 203 as a ground plane structure, thus serving as ground planes 401, 403.

Figure 5:
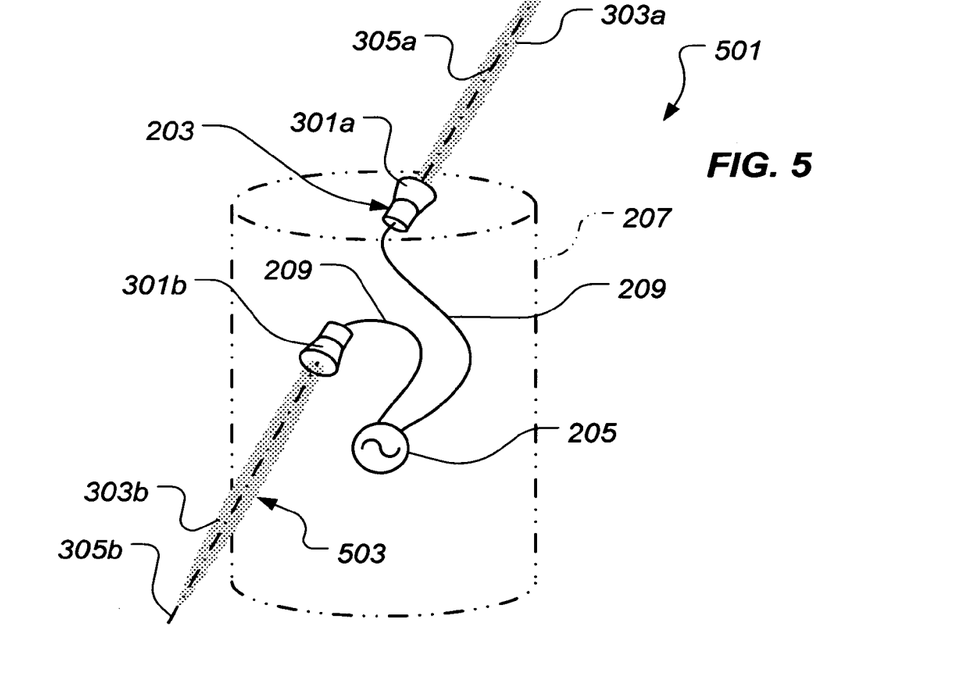
FIG. 5 is stylized, perspective view of a second illustrative embodiment of an electromagnetic impulse transmission system, according to the present invention.
Figure 6:
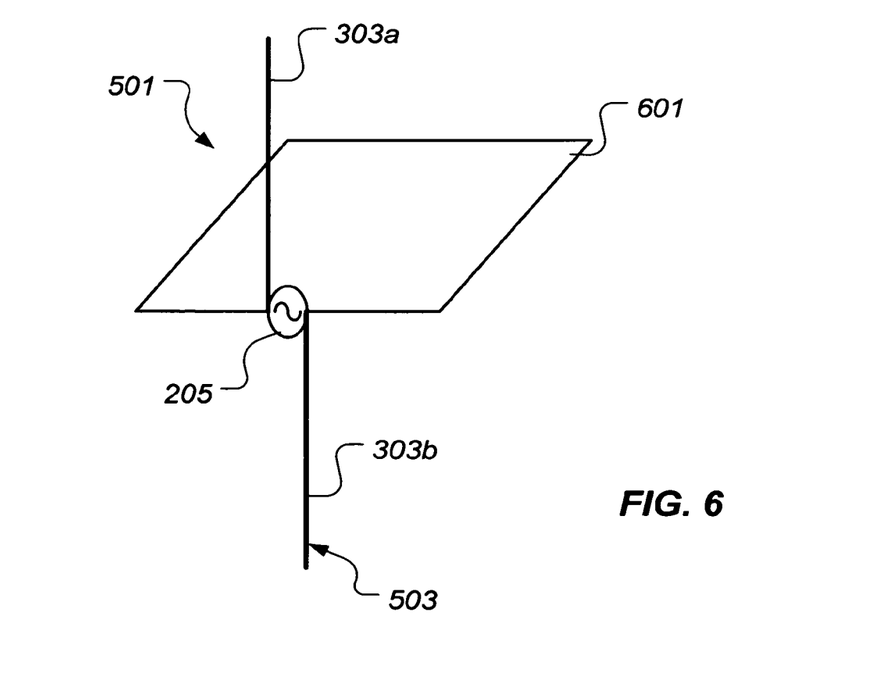
FIG. 6 is a schematic representation of the electromagnetic impulse transmission system of FIG. 5.

FIG. 5 depicts a second illustrative embodiment of an electromagnetic impulse transmission system 501 according to the present invention. The embodiment of FIG. 5 generally corresponds to the embodiment of FIG. 2, omitting plasma sources 301c, 301d and leads 209 electrically connecting plasma sources 301c, 301d and electromagnetic impulse generator 205. Plasmas 303a, 303b form a dipole plasma antenna 503, corresponding to the schematic representation provided in FIG. 6. Body 207 serves as a ground plane 601 for the electromagnetic impulse transmission system 501 when operated.

Figure 7:
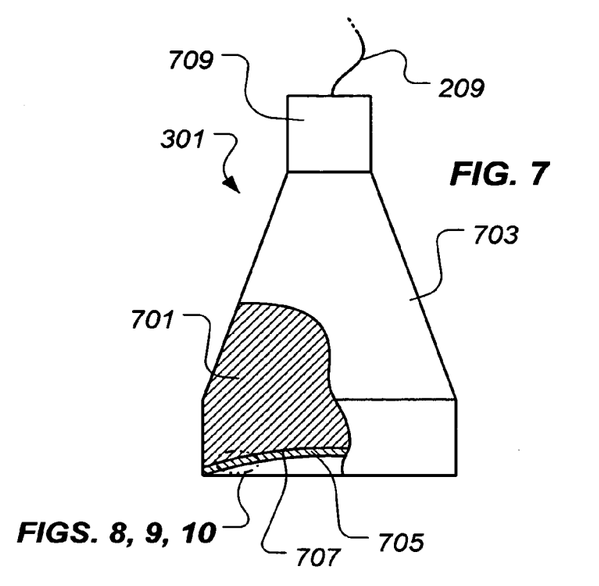
FIG. 7 is a side, elevational view of an illustrative embodiment of a columnar plasma source according to present invention.

FIG. 7 depicts one particular embodiment of plasma source 301. In the illustrated embodiment, plasma source 301 is implemented as a "shaped charge", which includes an explosive that has been shaped in such a way that, when detonated, the energy of the detonated explosive is channeled in one general direction. In the illustrated embodiment, plasma source 301 includes an explosive charge 701 disposed in a housing 703. A liner 705 comprising an ionizable material is disposed on or proximate a forward face 707 of explosive charge 701. Note that forward face 707 of explosive charge 701 and liner 705 may take on any shape suitable for a shaped charge. Examples of such shapes include, but are not limited to, conical, hemispherical (shown in FIG. 7), trumpet-shaped, bi-conic, and the like. Explosive charge 701 is detonated by detonator 709. Detonator 709 may be initiated by an electrical signal transmitted through lead 209 or by other initiation means.

Explosive charge 701 may comprise any explosive material capable of propelling the ionizable material and imparting sufficient energy to the ionizable material to ionize the ionizable material. High detonation velocity explosives are well suited for explosive charge 701. Generally, a high detonation velocity explosive is characterized as an explosive material having a detonation velocity of at least about 6000 meters per second. Examples of high detonation velocity explosive materials include, but are not limited to, cyclotetramethylenetetranitramine (HMX), HMX blended with another explosive material (i.e., an "HMX blend"), cyclotrimethylenetrinitramine (RDX), RDX blended with another explosive material (i.e., an "RDX blend"), an HMX/estane blend (e.g., LX-14), or the like.

Figure 8:
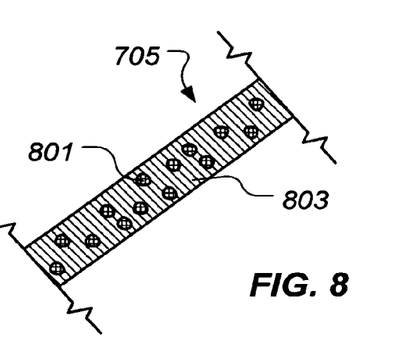
FIGS. 8-10 are cross-sectional views of various alternative, illustrative embodiments of a liner of the plasma source of FIG. 7.
Figure 9:
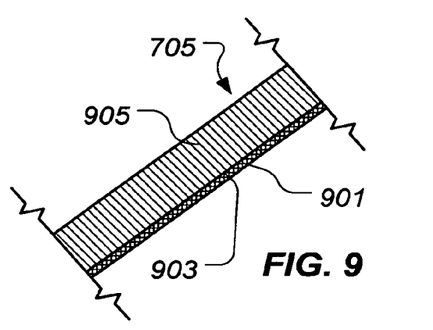
Figure 10:
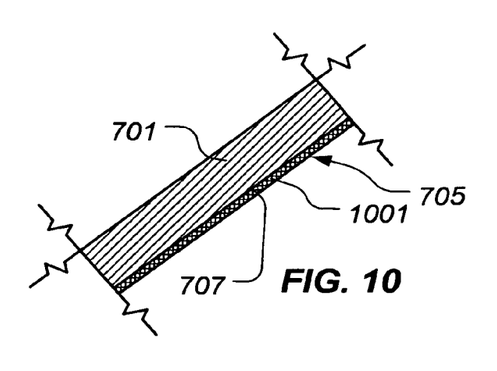

As discussed above, liner 705 includes an ionizable material. Liner 705 may also include other materials, such as copper, a copper alloy, a ceramic, or other material suitable for shaped charge liners. FIGS. 8-10 illustrate, in cross-section, three particular embodiments of liner 705 according to the present invention. FIG. 8 illustrates an embodiment wherein particles 801 (only one indicated for clarity) of ionizable material are disposed in a matrix 803 of copper, a copper alloy, a ceramic, or other suitable shaped charge liner material. Note that the present invention is not limited to the particular size of particles 801 illustrated in FIG. 8. Rather, particles 801 may be of any suitable size, including sizes that are not visible to the naked eye.

Liner 705 may alternatively comprise a coruscative compound, which is a compound that, when explosively compressed, detonates and forms solid detonation products without gas detonation products. This reaction, which is also known as a "heat reaction", can liberate several times the amount of energy density of the explosive that initiates the coruscative detonation. Coruscative compounds include, but are not limited to, carbon powder with titanium powder, carbon powder with zirconium powder, carbon powder with hafnium powder, tantalum powder with carbon powder, and the like. Note that the carbon powder in the exemplary compounds provided above may be replaced with boron powder. In one such example, liner 705 may comprise tantalum powder with boron powder, resulting in a lighter weight liner 705 with similar energy released at detonation, as compared to liner 705 comprising tantalum powder with carbon powder.

FIG. 9 provides an alternative, illustrative embodiment of liner 705, wherein the ionizable material is disposed as a layer 901 on a forward or outer face 903 of a substrate 905. Substrate 905 may comprise copper, a copper alloy, or other suitable shaped charge liner material. In one embodiment, layer 901 of ionizable material comprises a layer of particulate ionizable material.

FIG. 10 provides another illustrative, alternative embodiment of liner 705 according to the present invention. In this embodiment, a layer 1001 of ionizable material is disposed directly on forward face 707 of explosive charge 701. It should be noted that the ionizable material may be incorporated into plasma source 301 (shown in FIG. 3) in any suitable fashion, such that explosive charge 701, when detonated, propels the ionizable material and imparts heat energy into the ionizable material to ionize the ionizable material or initiate a secondary reaction in the liner to locally heat, and thus ionize, the ionizable material.

The ionizable material may comprise any material capable of being ionized as a result of heating induced by being propelled by explosive charge 701 when detonated. For example, the ionizable material may comprise one or more alkali metals; may comprise a compound of one or more alkali metals, such as alkali salts, alkali carbonates, and the like; or may be a constituent of a compound of one or more alkali metals. Alkali metals include lithium, sodium, potassium, rubidium, cesium, and francium. Further, the ionizable material may be mechanically combined with another material. For example, the ionizable material may comprise particulates within another material or may comprise a layer affixed to another material, as discussed above concerning FIGS. 8 and 9. The ionizable material may be a component of a clathrate, in which particles of the ionizable material are trapped within the crystal lattice of another material. The ionizable material may be a component of an intercalation compound, wherein particles of the ionizable material are trapped between layers of another material's crystal lattice. These forms of the ionizable material, however, are merely exemplary and are not exclusive. The ionizable material may take on any suitable form, such that explosive charge 701, when detonated, propels the ionizable material and imparts energy sufficient to heat, and thus ionize, the ionizable material. Alternatively, the detonation of the explosive charge 701 can propel liner 705 and the ionizable material, initiating a secondary reaction in the liner 705 material, which locally heats and ionizes the ionizable material.

Figure 11:
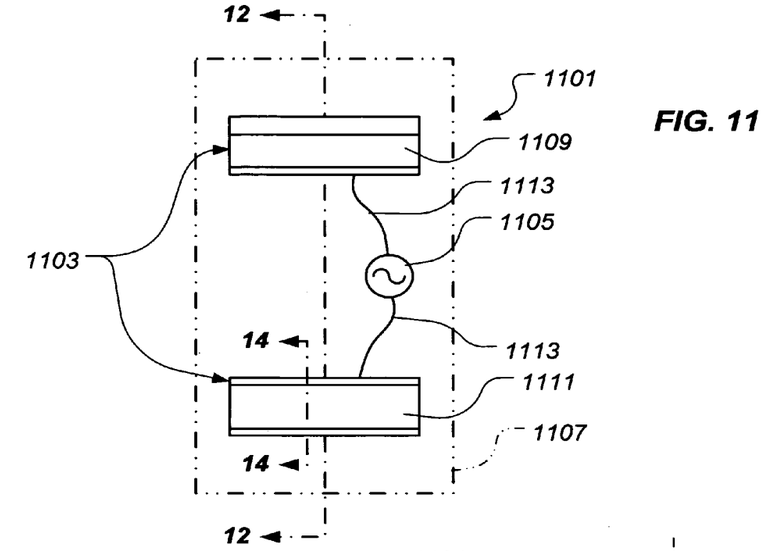
FIG. 11 is a stylized, side elevational view of a third illustrative embodiment of an electromagnetic impulse transmission system, according to the present invention.
Figure 12:
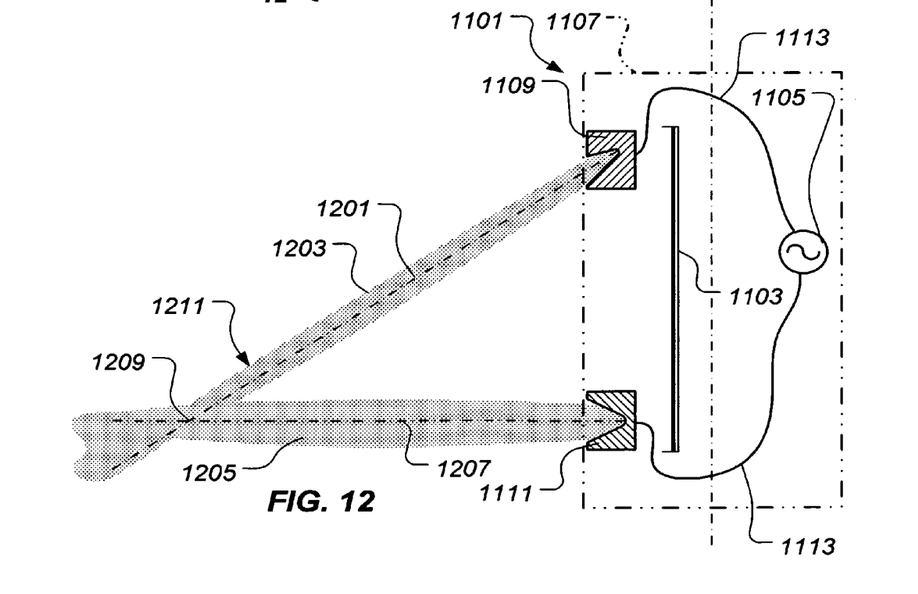
FIG. 12 is a stylized, cross-sectional view of the electromagnetic impulse transmission system of FIG. 11, taken along the line 12-12 of FIG. 11.
Figure 13:
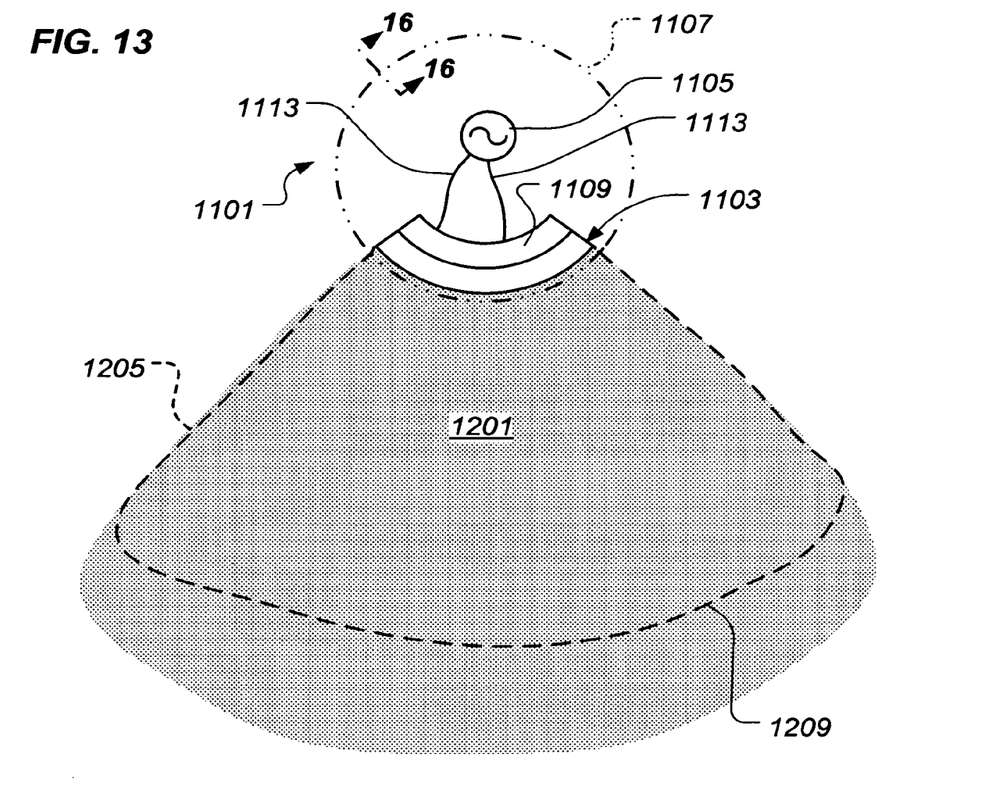
FIG. 13 is a stylized, top, plan view of the electromagnetic impulse transmission system of FIG. 11 with plasmas emitted therefrom.

FIGS. 11-13 depict a third illustrative embodiment of a electromagnetic impulse transmission system 1101 according to the present invention. Electromagnetic impulse transmission system 1101 comprises a plasma antenna generator 1103 electrically coupled with an electromagnetic impulse generator 1105. Plasma antenna generator 1103 and electromagnetic impulse generator 1105 are disposed within a housing or body 1107, shown in phantom to better illustrate the present invention. Electromagnetic impulse generator 1105 may comprise any suitable electromagnetic impulse generator, such as those described in relation to the embodiments of FIGS. 2, 4, 5, and 6.

Plasma antenna generator 1103 includes one or more sheet plasma sources 1109, 1111 as an alternative to plasma sources 301. Note that the term "sheet", as it is used herein, means a planar or non-planar sheet. Plasma antenna generator 1103 may be operated in the same way discussed above concerning plasma antenna generator 203; however, plasma antenna generator 1103 generates sheet-like plasmas rather than generally columnar plasmas. Sheet plasma sources 1109, 1111 are electrically coupled with electromagnetic impulse generator 1105 via leads 1113.

FIG. 12 depicts electromagnetic impulse transmission system 1101 in cross-section. In the illustrated embodiment, each of sheet plasma sources 1109, 1111 comprises a "line charge", as will be discussed in greater detail below, and extends partially around body 1107, as is more clearly shown in FIG. 13. Note that for the purposes of this disclosure, the term "line charge" means a charge extending along a straight or curved path, as will be more fully discussed below.

Sheet plasma source 1109 generates a sheet-like plasma 1201 generally extending along a surface 1203. Sheet plasma source 1111 generates a sheet-like plasma 1205 generally extending along a surface 1207. In this context, the term "surface" means "a planar or curved two-dimensional locus of points." Plasmas 1201, 1205 intersect generally along boundary 1209, forming a sheet plasma antenna 1211. In FIG. 13, plasma 1205 is generally covered by plasma 1201 and, thus, the boundary 1209 of plasma 1205 is represented by a hidden line. In this particular embodiment, plasma source 1109 is configured to generate plasma 1201 downwardly, as illustrated in FIG. 12, toward plasma 1205. Alternatively, electromagnetic impulse transmission system 1101 may include two sheet plasma sources 1111, with one or both of sheet plasma sources canted within body 1107 such that plasmas 1205 emitted therefrom intersect.

Figure 14:
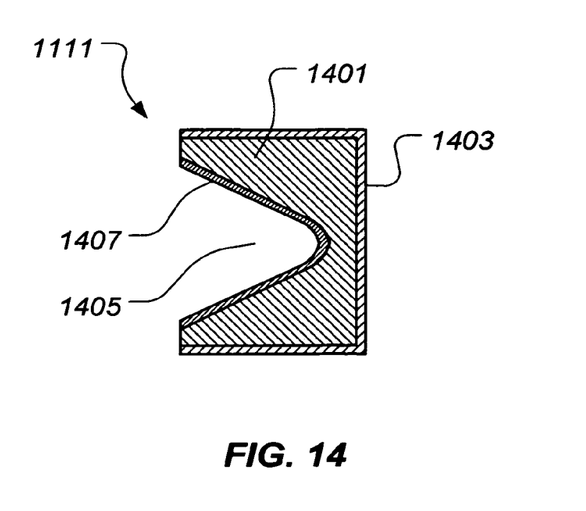
FIG. 14 is a stylized, enlarged, cross-sectional view of a plasma source of FIG. 11, taken along the line 14-14 of FIG. 11.

FIG. 14 illustrates one particular construction of plasma source 1111 in cross-section. In this embodiment, plasma source 1111 comprises a linear shaped charge. Note that, in this context, the term "linear shaped charge" includes linear shaped charges that have straight or curved forms and may be flexible or rigid. Plasma source 1111 includes an explosive charge 1401 disposed in a housing 1403. Explosive charge 1401 defines a groove 1405. Explosive charge 1401 may comprise any suitable explosive material, such as the materials discussed above concerning explosive charge 701 (shown in FIG. 7). A liner 1407 is disposed in groove 1405. Liner 1407 comprises an ionizable material, as discussed above concerning liner 705 (shown in FIG. 7). Liner 1407 may, in various embodiments, have a construction corresponding to the constructions of FIGS. 8-10. Note that plasma source 1109 may have a construction corresponding to that of plasma source 1111, except that plasma source 1109 is configured to generate plasma 1201 downwardly, as discussed above.

While embodiments of the present electromagnetic impulse transmission system, such as electromagnetic impulse transmission system 201, 501, 1101, may have widely varied uses, one particular application is in ground-penetrating, water-penetrating, and structure-penetrating radar. Such radar systems can sense, for example, caves, bunkers, shelters, caverns, pools, dissimilar geologic structures, and the like beneath ground. Moreover, such radar systems can sense objects under water or within building structures.

Figure 15:
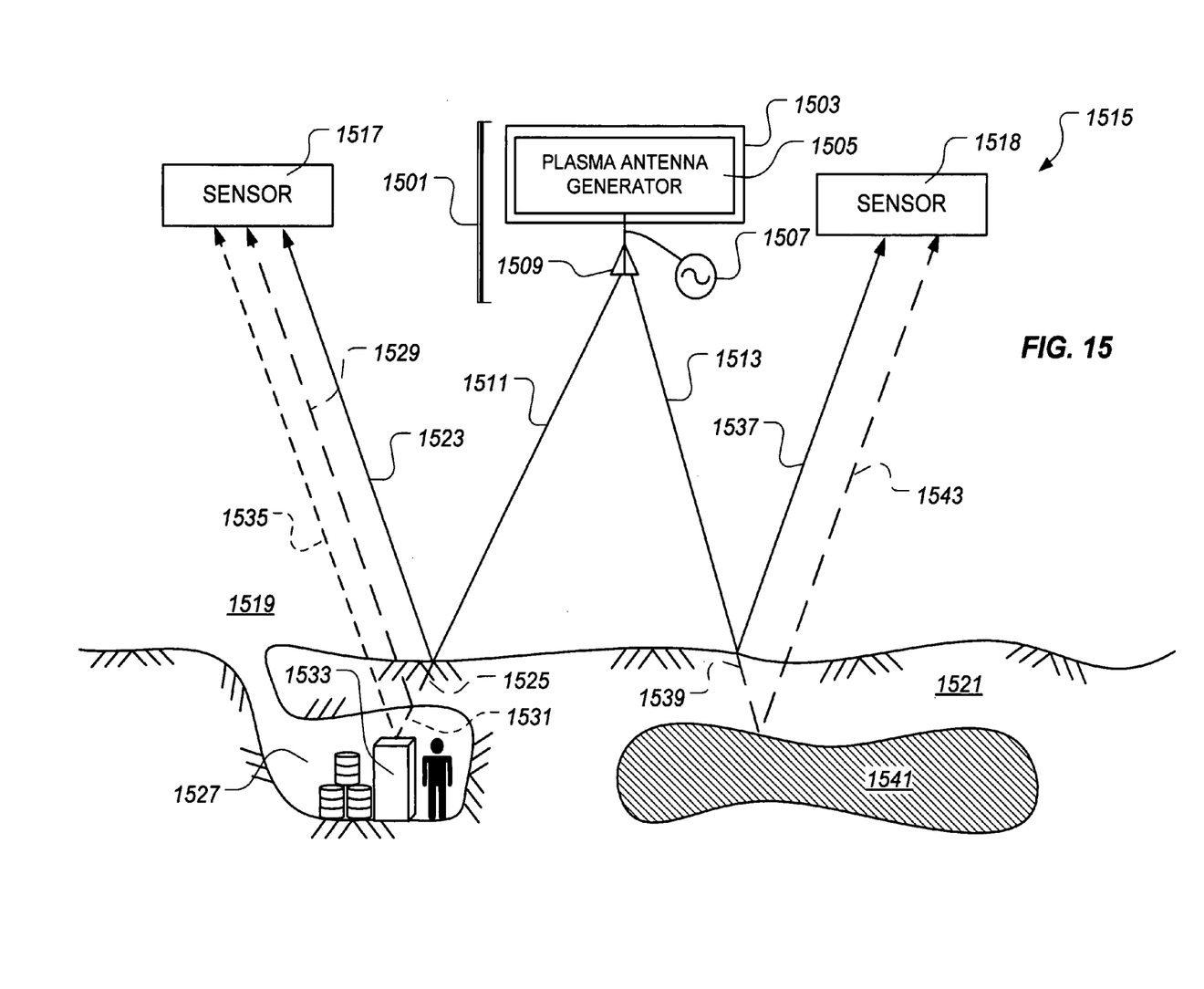
FIG. 15 is a stylized diagram of an illustrative embodiment an electromagnetic impulse transmission system in one particular use.

For example, as shown in FIG. 15, an electromagnetic impulse transmission system 1501 comprises a body 1503 housing a plasma antenna generator 1505 electrically coupled with an electromagnetic impulse generator 1507. As illustrated, plasma antenna generator 1505 has generated a plasma antenna 1509 and electromagnetic impulse generator 1507 has transmitted an electromagnetic impulse, comprising electromagnetic waves 1511, 1513, via plasma antenna 1509. The present invention encompasses an electromagnetic impulse sensing system 1515 (e.g., a radar sensing system) comprising electromagnetic impulse transmission system 1501 and one or more sensors 1517, 1518 for receiving and analyzing reflected electromagnetic waves.

As shown in FIG. 15, a portion of electromagnetic wave 1511 is reflected by an interface between air 1519 and ground 1521 as a reflected electromagnetic wave 1523, which is received by sensor 1517. The rest of the energy of wave 1511 propagates into ground 1521 as electromagnetic wave 1525. Upon encountering a second interface, such as an interface between ground 1521 and a cavern 1527, a portion of the energy of electromagnetic wave 1525 is reflected as a reflected electromagnetic wave 1529. Reflected electromagnetic wave 1529 is then received by sensor 1517. The rest of the energy of wave 1525 propagates into cavern 1527 as electromagnetic wave 1531, encountering an interface between air 1519 and an object 1533 within cavern 1527. At least a portion of electromagnetic wave 1531 is reflected as a reflected electromagnetic wave 1535, which is received by sensor 1517.

Still referring to FIG. 15, a portion of electromagnetic wave 1513 is reflected by an interface between air 1519 and ground 1521 as reflected electromagnetic wave 1537, which is received by sensor 1518. The rest of the energy of wave 1513 propagates into ground 1521 as electromagnetic wave 1539. Upon encountering a second interface, such as an interface between ground 1521 and an underground pool or geologic formation 1541 different from ground 1521, a portion of the energy of electromagnetic wave 1537 is reflected as a reflected electromagnetic wave 1543. Reflected electromagnetic wave 1543 is then received by sensor 1518. Note that sensors 1517, 1518 sense and analyze reflected electromagnetic waves 1523, 1529, 1535, 1537, and 1543 to determine various characteristics of the interfaces and objects reflecting electromagnetic waves 1523, 1529, 1535, 1537, and 1543.

Figure 16A:
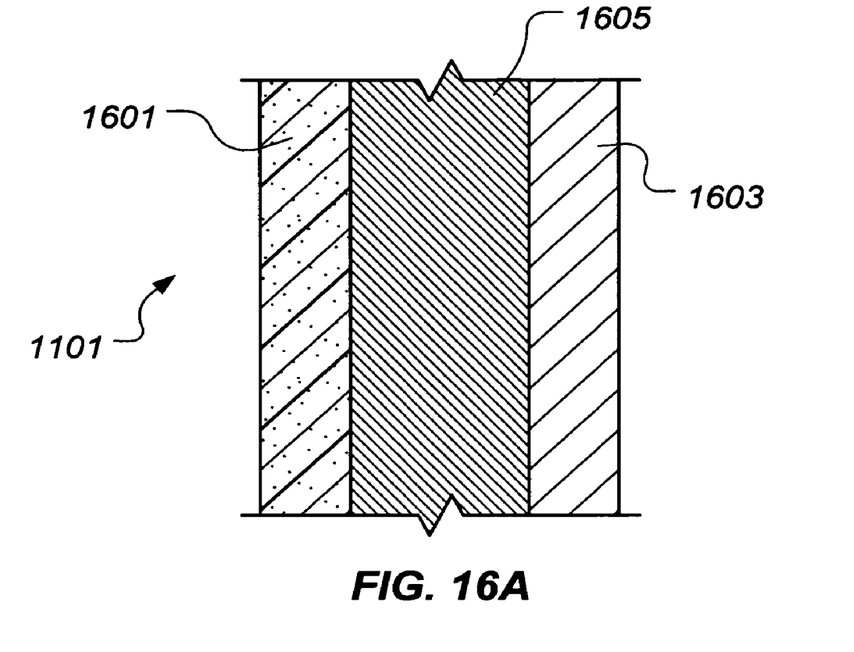
FIGS. 16A and 16B are stylized, cross-sectional views of particular embodiments of a body of the electromagnetic impulse transmission system of FIG. 13, taken along the line 16-16 in FIG. 13.
Figure 16B:
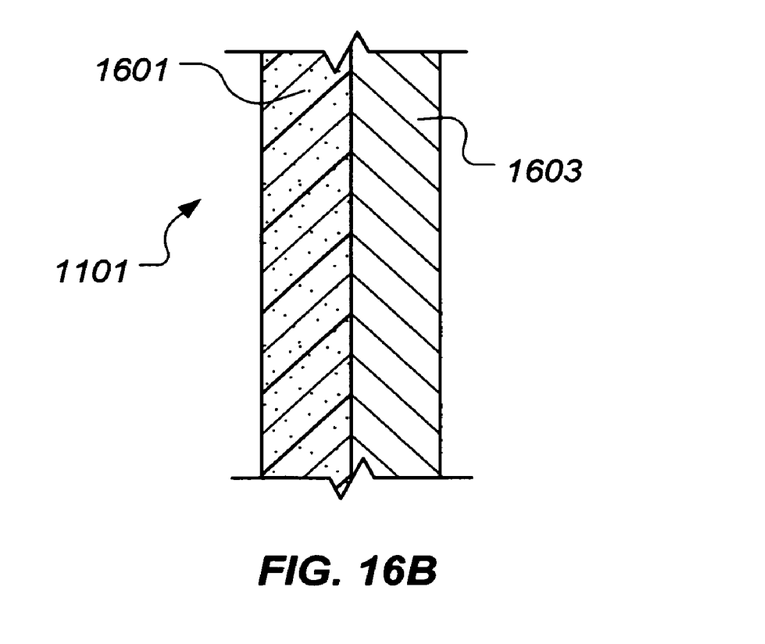

In some implementations, electric currents and/or electromagnetic fields may be generated within body 1107 or reflected by body 1107, thus interfering with electromagnetic waves emitted by plasma antenna 1211. Therefore, as shown in FIGS. 16A and 16B, body 1107 may, in certain embodiments, comprise an electrically lossy layer 1601 and a layer 1603 having high electromagnetic permeability. Generally, it is desirable for the direction of highest permeability of layer 1603 to be oriented generally perpendicular to the direction of lowest electrical conductivity of layer 1601. In one particular embodiment, electrically lossy layer 1601 comprises a plurality of carbon fibers disposed in an epoxy matrix. Electrically lossy layer 1601 may, however, comprise other materials and such electrically lossy layers are within the scope of the present invention. In one embodiment, layer 1603 comprises ferrite, disposed such that the high permeability axis of layer 1603 is oriented generally in the same direction as a magnetic field launched by electromagnetic impulse generator 1105. Alternatively, other high permeability materials, such as nickel, steel, or soft iron, may comprise layer 1603. It should be noted that layer 1601 may be disposed adjacent layer 1603, as illustrated in FIG. 16B, or layer 1601 may be spaced apart from layer 1603 by a structural member 1605, as shown in FIG. 16A. Note that body 207 may have a construction corresponding to that of body 1107 shown in FIGS. 16A and 16B.

Note that the plasma antenna embodiments of the present invention (e.g., plasma antennas 211, 503, 1211, 1509) may be used to receive electromagnetic waves. For example, in the embodiments of FIG. 2 or 5, electromagnetic impulse generator 205 may be replaced with an electromagnetic impulse detector element. In another example, electromagnetic impulse generator 1105 of the embodiment of FIGS. 11-13 may be replaced with an electromagnetic impulse detector element. Such an electromagnetic impulse detector element preferably has an impedance that is much larger than the impedance of the medium in which the plasma antenna is operated. For example, the impedance of such an electromagnetic impulse detector element may be an order of magnitude larger than the impedance of the medium in which the plasma antenna is operated. In one particular embodiment, the impedance of the electromagnetic impulse detector element is greater than about 3000 ohms for a plasma antenna operated in free space having an impedance of between about 300 ohms and about 400 ohms. In one particular embodiment, electromagnetic impulse detector element comprises a high impedance, differential amplifier.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. An electromagnetic impulse transmission system, comprising:
   a plasma antenna generator;
   an electromagnetic impulse generator electrically coupled with the plasma antenna generator; and
   a ground plane structure operably associated with the plasma antenna generator the ground plane structure comprising:
      a housing in which the plasma antenna generator is disposed, the housing comprising:
         an electrically lossy layer; and
         a layer having high permeability to an electromagnetic field.

2. The electromagnetic impulse transmission system, according to claim 1, wherein the plasma antenna generator, upon activation, generates one of a turnstile plasma antenna and a crossed-dipole plasma antenna.

3. The electromagnetic impulse transmission system, according to claim 1, wherein the plasma antenna generator, upon activation, generates a dipole plasma antenna.

4. The electromagnetic impulse transmission system, according to claim 1, wherein the plasma antenna generator, upon activation, generates a sheet plasma antenna.

5. The electromagnetic impulse transmission system, according to claim 1, wherein the plasma antenna generator comprises:
   at least one columnar plasma source.

6. The electromagnetic impulse transmission system, according to claim 1, wherein the plasma antenna generator comprises:
   at least one sheet plasma source.

7. An electromagnetic impulse transmission system, comprising:
   a plasma antenna;
   an electromagnetic impulse generator electrically coupled with the plasma antenna; and
   a ground plane operably associated with the plasma antenna, the ground plane comprising:
      a housing, the housing comprising:
         an electrically lossy layer; and
         a layer having high permeability to an electromagnetic field.

8. The electromagnetic impulse transmission system, according to claim 7, wherein the plasma antenna is one of a turnstile plasma antenna and a crossed-dipole plasma antenna.

9. The electromagnetic impulse transmission system, according to claim 7, wherein the plasma antenna is a dipole plasma antenna.

10. The electromagnetic impulse transmission system, according to claim 7, wherein the plasma antenna is a sheet plasma antenna.

11. An electromagnetic impulse transmission system, comprising:
an unconfined plasma antenna;
an electromagnetic impulse generator electrically coupled with the plasma antenna; and
a ground plane operably associated with the plasma antenna.

12. The electromagnetic impulse transmission system, according to claim 11, wherein the plasma antenna is one of a turnstile plasma antenna, a crossed-dipole plasma antenna, a dipole plasma antenna, and a sheet plasma antenna.

13. The electromagnetic impulse transmission system, according to claim 11, wherein the ground plane comprises:
a housing.

14. The electromagnetic impulse transmission system, according to claim 13, wherein the housing comprises:
an electrically lossy layer; and
a layer having high permeability to an electromagnetic field.

15. A sensing system, comprising:
a plasma antenna generator;
an electromagnetic impulse generator electrically coupled with the plasma antenna generator;
a ground plane structure operably associated with the plasma antenna generator; and
a sensor adapted to receive a reflected electromagnetic impulse, such that reflected electromagnetic impulse is at least a portion of an electromagnetic impulse generated by the electromagnetic impulse generator and transmitted via a plasma antenna generated by the plasma antenna generator.

16. The sensing system, according to claim 15, wherein the plasma antenna generator, upon activation, generates one of a turnstile, a crossed-dipole, a dipole, and a sheet plasma antenna.

17. The sensing system, according to claim 15, wherein the ground plane structure comprises:
a housing in which the plasma antenna generator is disposed.

18. The sensing system, according to claim 17, wherein the housing comprises:
an electrically lossy layer; and
a layer having high permeability to an electromagnetic field.

19. A method, comprising:
providing an electromagnetic impulse transmission system, including a plasma antenna generator, an electromagnetic impulse generator electrically coupled with the plasma antenna generator, and a ground plane structure operably associated with the plasma antenna generator;
generating a plasma antenna with the plasma antenna generator;
transmitting an electromagnetic impulse from the electromagnetic impulse generator to the plasma antenna;
radiating the electromagnetic impulse from the plasma antenna such that at least a portion of the electromagnetic impulse is reflected by the ground plane; and
sensing an electromagnetic impulse reflected from an interface at an object disposed under ground, under water or within a building structure, such that the reflected electromagnetic impulse is at least a portion of the electromagnetic impulse generated by the electromagnetic impulse generator, transmitted via the plasma antenna, and reflected by the ground plane structure.

20. The method, according to claim 19, wherein the step of generating the plasma antenna further comprises:
generating one of a turnstile plasma antenna, a crossed-dipole plasma antenna, a dipole, and a sheet plasma antenna.

21. The method, according to claim 19, wherein generating the plasma antenna further comprises:
explosively generating the plasma antenna.

22. The method, according to claim 19, wherein the ground plane structure comprises:
a body in which the plasma antenna generator is disposed.

23. An electromagnetic impulse transmission system, comprising:
a plasma antenna generator configured to generate an unconfined plasma antenna;
an electromagnetic impulse generator electrically coupled with the plasma antenna generator; and
a ground plane structure operably associated with the plasma antenna generator.

24. The electromagnetic impulse transmission system, according to claim 23, wherein the ground plane structure comprises:
a housing in which the plasma antenna generator is disposed.

25. The electromagnetic impulse transmission system, according to claim 23, wherein the plasma antenna generator, upon activation, generates one of a turnstile plasma antenna, a crossed-dipole plasma antenna, a dipole antenna, and a sheet antenna.

26. The electromagnetic impulse transmission system, according to claim 23, wherein the plasma antenna generator comprises:
at least one columnar plasma source or at least one sheet plasma source.

27. The electromagnetic impulse transmission system, according to claim 24, wherein the housing comprises:
an electrically lossy layer; and
a layer having high permeability to an electromagnetic field.

* * * * *